(12) United States Patent
Oba et al.

(10) Patent No.: US 11,320,078 B2
(45) Date of Patent: May 3, 2022

(54) CHECKING TOOL FOR TUBE COUPLER

(71) Applicants: YODOGAWA HU-TECH CO., LTD., Suita (JP); CKD CORPORATION, Aichi (JP)

(72) Inventors: Naoyuki Oba, Suita (JP); Akihiro Yamamoto, Suita (JP); Katsumi Ogawa, Suita (JP); Hiroki Iwata, Aichi (JP)

(73) Assignees: YODOGAWA HU-TECH CO., LTD., Osaka (JP); CKD CORPORATION, Aichi (JP)

( * ) Notice: Subject to any disclaimer, the term of this patent is extended or adjusted under 35 U.S.C. 154(b) by 438 days.

(21) Appl. No.: 16/509,925

(22) Filed: Jul. 12, 2019

(65) Prior Publication Data

US 2020/0025322 A1    Jan. 23, 2020

(30) Foreign Application Priority Data

Jul. 18, 2018 (JP) .............................. JP2018-134971
Jun. 5, 2019 (JP) .............................. JP2019-105396

(51) Int. Cl.
*F16L 37/20* (2006.01)

(52) U.S. Cl.
CPC ............ *F16L 37/20* (2013.01); *F16L 2201/10* (2013.01)

(58) Field of Classification Search
CPC ....... F16L 37/20; F16L 2201/10; F16L 21/06; F16L 23/06; F16L 2201/60; F16L 23/10
See application file for complete search history.

(56) References Cited

U.S. PATENT DOCUMENTS 1,646,463 A * 10/1927 Stokesberry ............ F16L 23/06
                                                            285/409
2,649,632 A *  8/1953 Kessler ................... F16L 23/06
                                                             24/270

(Continued)

FOREIGN PATENT DOCUMENTS

JP       2017-180816 A    10/2017

*Primary Examiner* — Zachary T Dragicevich
*Assistant Examiner* — James A Linford
(74) *Attorney, Agent, or Firm* — Eckert Seamans Cherin & Mellott, LLC

(57) ABSTRACT

The present invention provides a checking tool for a tube coupler with which it is possible to visually check an attachment state of the tube coupler. A checking tool 10 for a tube coupler according to the present invention is a checking tool configured to be attached to a tube coupler 30, the tube coupler being formed of a first coupling piece 31 and a second coupling piece 35 hingedly connected to each other so as to be able to be opened and closed, being configured to couple tubes to each other with use of the first coupling piece and the second coupling piece, and having hook pieces 33 and 37 that are provided protruding from outer circumferential surfaces of the first coupling piece and the second coupling piece. The checking tool includes a pair of longitudinal frames 11 that conform to an outer circumferential surface of the tube coupler, a first lateral frame 12 that connects end portions at one end of the pair of longitudinal frames to each other, a second lateral frame 16 that connects end portions at the other end of the pair of longitudinal frames to each other, a first claw piece 13 that is provided protruding from the first lateral frame toward the second lateral frame, and a second claw piece 17 that is provided protruding from the second lateral frame toward the first lateral frame.

2 Claims, 9 Drawing Sheets

(56) References Cited

U.S. PATENT DOCUMENTS

| | | | | |
|---|---|---|---|---|
| 3,042,430 A | * | 7/1962 | Guy | F16L 23/06 285/365 |
| 4,705,305 A | * | 11/1987 | Ghaly | F16B 2/08 24/270 |
| 8,033,579 B2 | * | 10/2011 | Takeda | F16L 23/06 285/367 |
| 2018/0156362 A1 | * | 6/2018 | Takeda | F16L 43/02 |

* cited by examiner

CHECKING TOOL FOR TUBE COUPLER

BACKGROUND OF THE INVENTION

1. Field of the Invention

The present invention relates to a checking tool with which it is possible to visually check whether a tube coupler for coupling tubes to each other is correctly attached.

2. Description of Related Art

In various types of apparatuses, such as production apparatuses, cleaning apparatuses, and assembling apparatuses, used in the field of electronics such as semiconductors, the pharmaceutical field, the biotechnology field, and other fields, tubes made of fluorinated resin are used to supply and transfer a raw material fluid, a cleaning fluid, a fuel fluid, or the like.

As the tubes, joint-equipped tubes that have joints at their leading ends have been proposed. The joint-equipped tubes are connected via an annular sealing member (see Patent Literature 1, for example).

Patent Literature 1 discloses a tube coupler that sandwiches the joints and the sealing member from the outer circumferential surface side thereof. The tube coupler is composed of first and second semicircular arc-shaped coupling pieces that are hingedly connected to each other, and grooves into which the joints and the sealing member are to be fitted are formed in the inner circumference of the first coupling piece and the second coupling piece. The state in which the tubes are coupled to each other is maintained by inserting the joints and the sealing member into the first coupling piece and closing the second coupling piece.

CITATION LIST

Patent Literature

[Patent Literature 1] JP 2017-180816 A

SUMMARY OF THE INVENTION

With the tube coupler, the coupling between the tubes is guaranteed by fitting the joints and the sealing member into the grooves and correctly closing the second coupling piece. Therefore, it is necessary to check whether the tube coupler is correctly attached. However, the apparatus described above has a large number of tube couplers arranged therein, therefore, it is difficult to check the attachment state of individual tube couplers. Moreover, even after the attachment state has been checked, it is necessary to further check whether the attachment state is maintained.

It is an object of the present invention to provide a checking tool for a tube coupler with which it is possible to visually check an attachment state of the tube coupler.

A checking tool for a tube coupler according to the present invention is a checking tool configured to be attached to a tube coupler, the tube coupler being formed of a first coupling piece and a second coupling piece hingedly connected to each other so as to be able to be opened and closed, being configured to couple tubes to each other with use of the first coupling piece and the second coupling piece, and having hook pieces that are provided protruding from outer circumferential surfaces of the first coupling piece and the second coupling piece, the checking tool including:

a pair of longitudinal frames that conform to an outer circumferential surface of the tube coupler;
a first lateral frame that connects end portions at one end of the pair of longitudinal frames to each other;
a second lateral frame that connects end portions at another end of the pair of longitudinal frames to each other;
a first claw piece that is provided protruding from the first lateral frame toward the second lateral frame; and
a second claw piece that is provided protruding from the second lateral frame toward the first lateral frame,
wherein the checking tool is attached to the tube coupler by hooking, in a state in which the first coupling piece and the second coupling piece of the tube coupler are closed, the first claw piece on the hook piece of the first coupling piece and the second claw piece on the hook piece of the second coupling piece.

A configuration can be adopted in which the first claw piece is swingable in a direction that is perpendicular to the first lateral frame.

The above-described checking tool can be attached to the tube coupler by swinging, in a state in which the second claw piece is hooked on the hook piece of the second coupling piece, the first claw piece toward the first coupling piece relative to the first lateral frame, hooking the first claw piece on the hook piece of the first coupling piece, and pressing the first lateral frame against the first coupling piece.

A configuration may also be adopted in which the checking tool is attached to the tube coupler, and the first coupling piece and the second coupling piece are brought closer to each other and closed, by hooking, in a state in which the first coupling piece and the second coupling piece are not completely closed, the second claw piece on the hook piece of the second coupling piece, swinging the first claw piece toward the first coupling piece relative to the first lateral frame, hooking the first claw piece on the hook piece of the first coupling piece, and pressing the first lateral frame against the first coupling piece.

A configuration can be adopted in which the second claw piece has a second claw piece main body that is provided protruding from the center of the second lateral frame, and a pair of second claw piece auxiliary bodies that are provided protruding from opposite sides of the second claw piece main body, the second claw piece auxiliary bodies having resiliency and protruding further than the second claw piece main body.

The checking tool for a tube coupler according to the present invention is attached to the tube coupler by hooking the first claw piece and the second claw piece on the hook pieces of the first coupling piece and the second coupling piece. The checking tool can be attached only in a state in which the first coupling piece and second coupling piece of the tube coupler are correctly closed. While the first coupling piece and the second coupling piece are opened, there is a large distance between the hook pieces, making it impossible for the checking tool to be correctly attached. Accordingly, by confirming that the checking tool is attached to the tube coupler, it is possible to guarantee that tubes are correctly coupled to each other by the tube coupler, and the first coupling piece and the second coupling piece are closed.

DETAILED DESCRIPTION OF THE INVENTION

Figure 1:
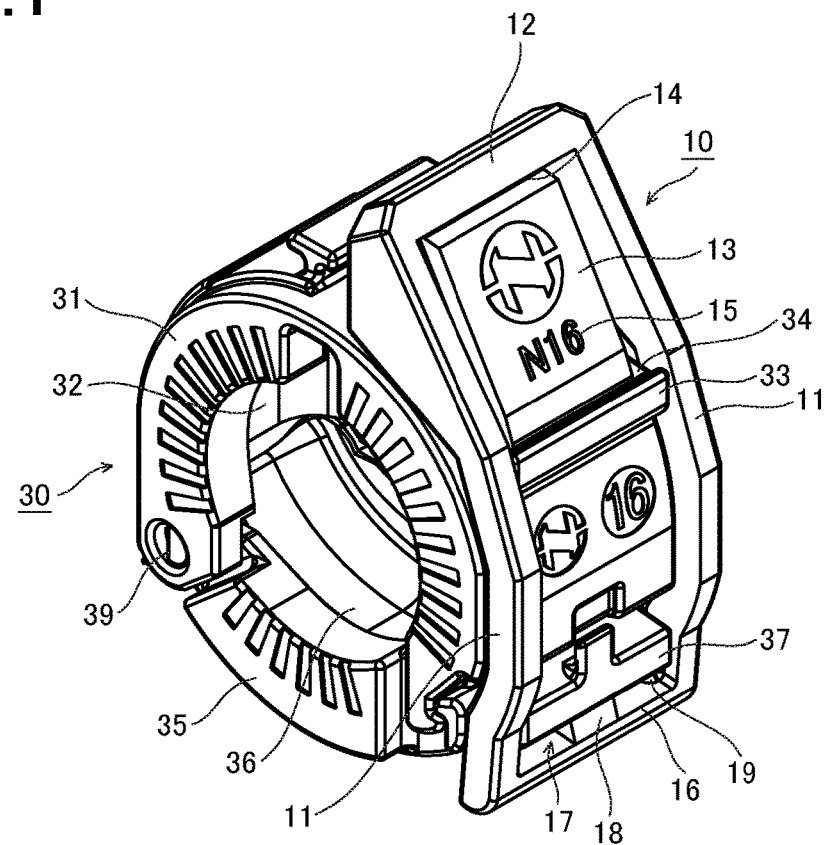
FIG. 1 is a perspective view of a tube coupler to which a checking tool according to an embodiment of the present invention is attached.
Figure 2:
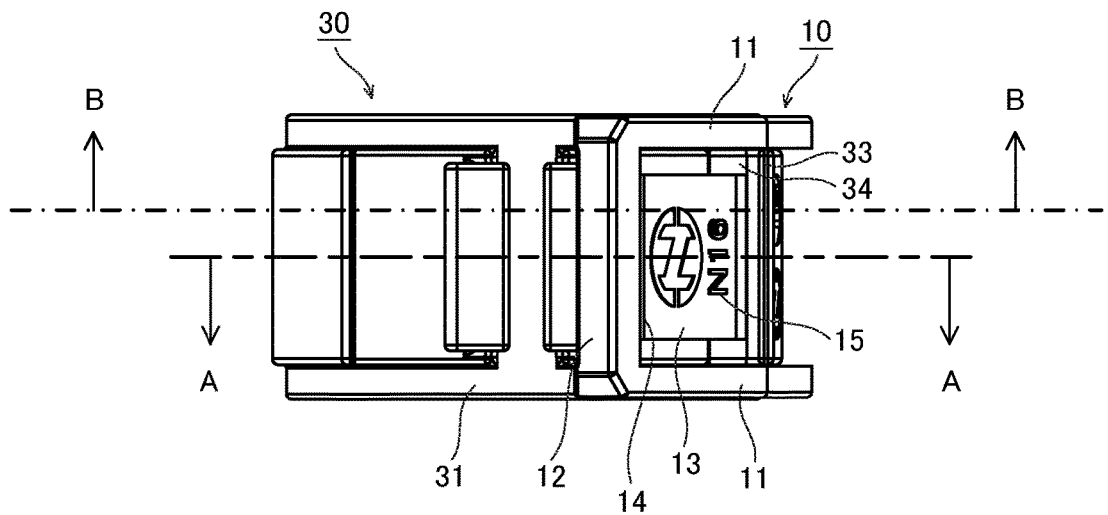
FIG. 2 is a plan view of the tube coupler shown in FIG. 1.
Figure 3:
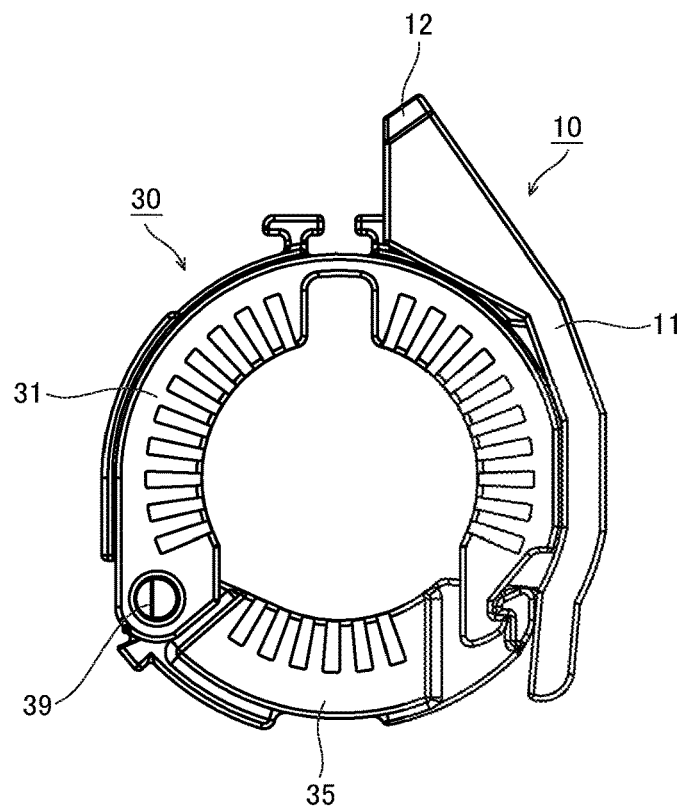
FIG. 3 is a side view of the tube coupler shown in FIG. 1.

Hereinafter, a checking tool 10 according to an embodiment of the present invention will be described with reference to the drawings.

FIGS. 1 to 5 show a tube coupler 30 to which the checking tool 10 according to the embodiment of the present invention is attached. As shown in these drawings, the tube coupler 30 of the present embodiment includes a substantially C-shaped first coupling piece 31 and a second coupling piece 35 that is linked to the first coupling piece 31 via a hinged connecting portion 39 so as to be swingable and that can be opened and closed relative to the first coupling piece 31. Grooves 32 and 36 are formed in the inner circumference of the first coupling piece 31 and the second coupling piece 35. Joints of joint-equipped tubes, which are not shown, are brought into abutment against each other via a sealing member and housed in the groove 32 of the first coupling piece 31, and in this state the second coupling piece 35 is closed. Thus, a state in which the joint-equipped tubes are coupled to each other is maintained.

Figure 4:
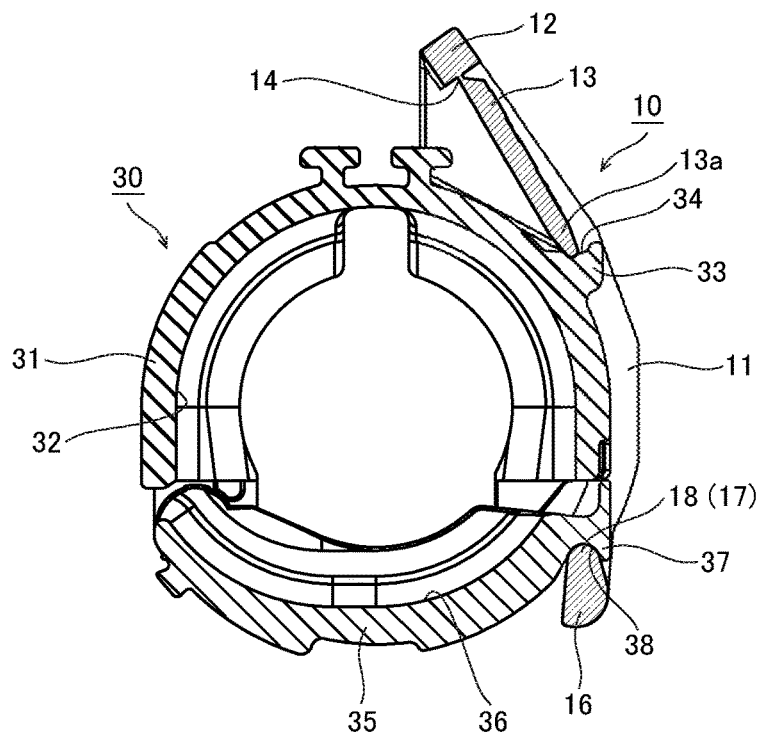
FIG. 4 is a cross-sectional view taken along line A-A in FIG. 2.
Figure 5:
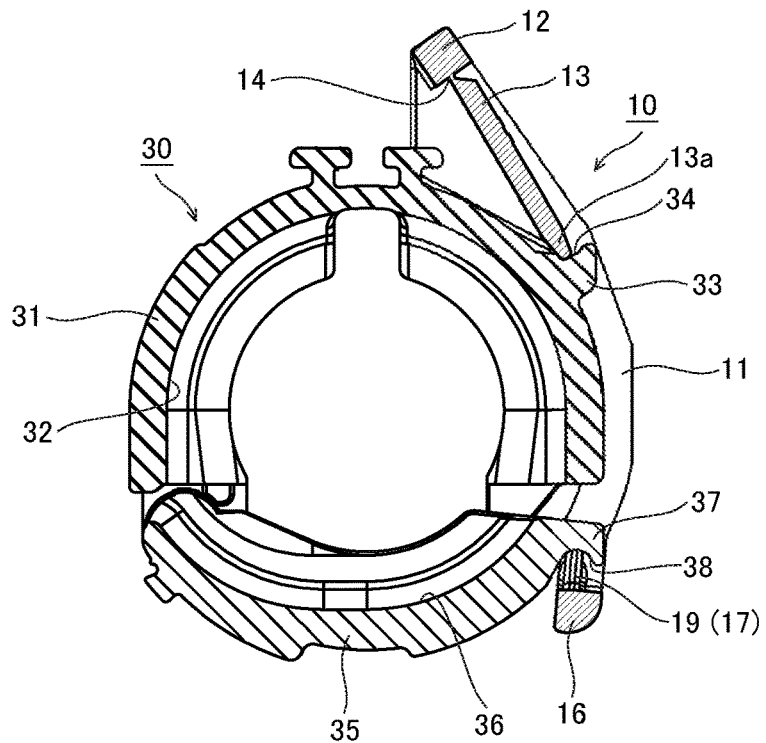
FIG. 5 is a cross-sectional view taken along line B-B in FIG. 2.

As shown in FIGS. 1, 4, and 5, in the tube coupler 30, hook pieces 33 and 37 are provided at or near respective end edges opposite to the hinged connecting portion 39 such that the hook pieces 33 and 37 protrude therefrom. Hook grooves 34 and 38 are recessed in non-opposing faces of the hook pieces 33 and 37, respectively, and the checking tool 10, which will be described next, is attached thereto. The hook pieces 33 and 37 are formed so as to be held by fingers or a jig when attaching the tube coupler 30 to the joint-equipped tubes and bringing the second coupling piece 35 closer to the first coupling piece 31 in a closing direction.

Figure 6:
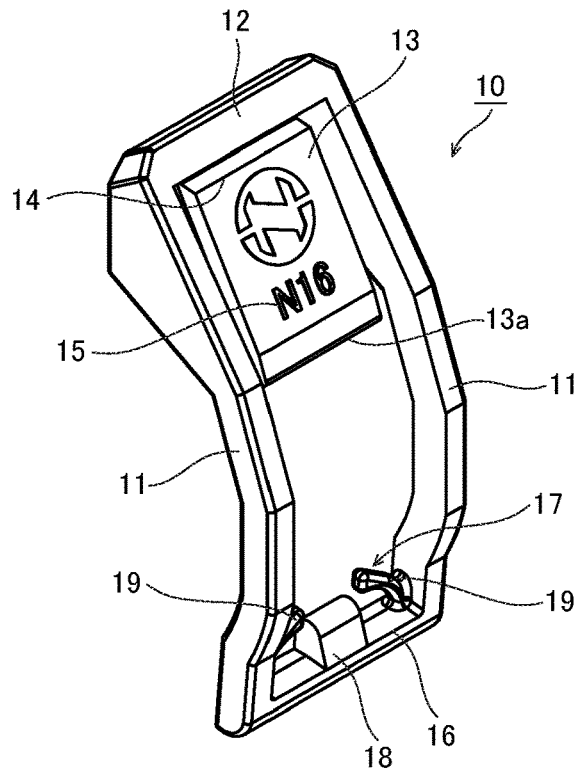
FIG. 6 is a perspective view of the checking tool according to the embodiment of the present invention.
Figure 7:
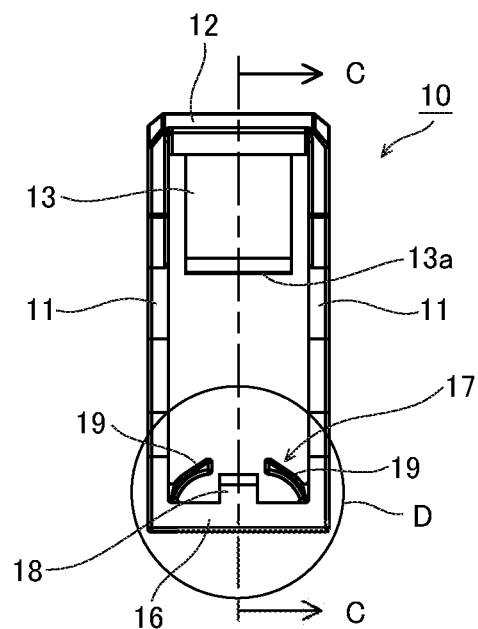
FIG. 7 shows the checking tool when viewed from the tube coupler side.
Figure 8:
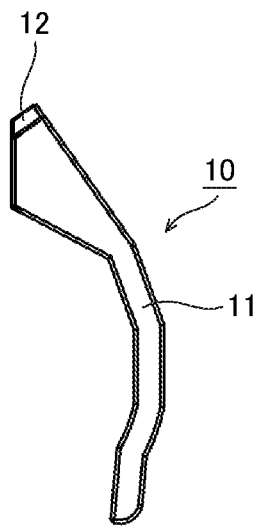
FIG. 8 is a left side view of the checking tool shown in FIG. 6.

As shown in FIGS. 1 to 5, the checking tool 10 is attached to the tube coupler 30 with use of the above-described hook pieces 33 and 37. FIGS. 6 to 11 show details of the checking tool 10. As shown in FIGS. 6 and 7, the checking tool 10 includes longitudinal frames 11 as well as lateral frames 12 and 16, the frames being arranged to form a substantially rectangular shape, and claw pieces 13 and 17 that are provided on the lateral frames 12 and 16, respectively. The checking tool 10 can be made of a resin such as polypropylene and, desirably, is colored so that whether or not the checking tool 10 is attached to the tube coupler 30 can be visually recognized with ease. The color can be varied depending on the product number, the size, or the like of the checking tool 10.

As shown in FIGS. 1 and 6 to 8, each longitudinal frame 11 has a shape conforming to an outer circumferential surface of the tube coupler 30, and an upper end side thereof in the drawings expands in a direction away from the tube coupler 30. The longitudinal frames 11 are spaced apart from each other by a distance that allows at least the hook pieces 33 and 37 to fit therein.

The lateral frames 12 and 16, which are the first lateral frame 12 on the upper side in the drawings and the second lateral frame 16 on the lower side, connect end portions of the longitudinal frames 11.

Figure 9:
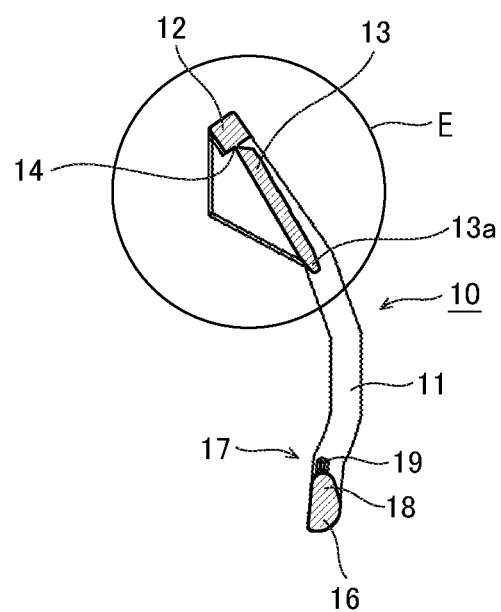
FIG. 9 is a cross-sectional view taken along line C-C in FIG. 7.
Figure 10:
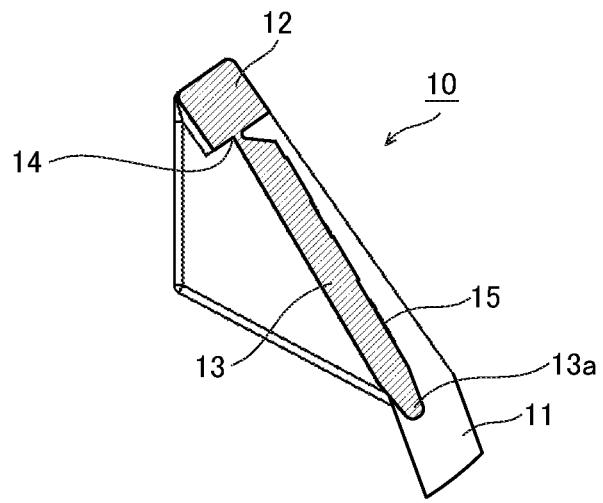
FIG. 10 is an enlarged cross-sectional view of a portion E enclosed by a circle in FIG. 9 and shows a first claw piece.
Figure 11:
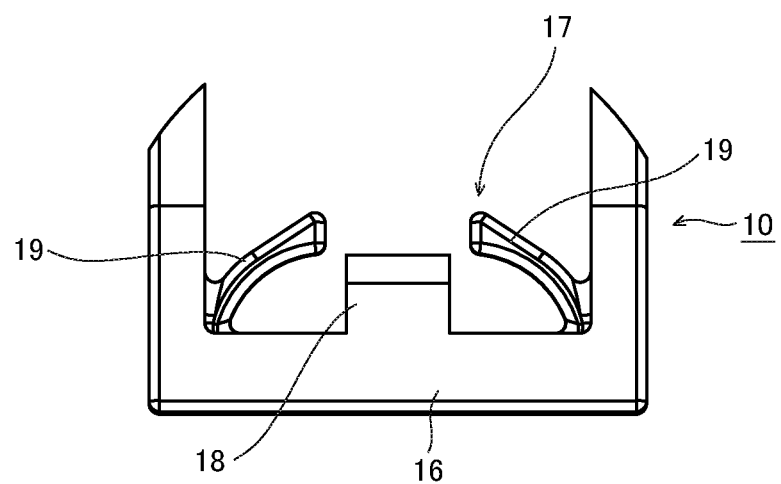
FIG. 11 is an enlarged view of a portion D enclosed by a circle in FIG. 7 and shows a second claw piece.

As shown in FIGS. 6, 7, 9, and 10, the first lateral frame 12 has a first claw piece 13 that is provided protruding inward toward the second lateral frame 16. In the embodiment shown in the drawings, the first claw piece 13 is a wide plate-shaped member. The first claw piece 13 is formed so as to be swingable in a direction that is perpendicular to the first lateral frame 12. For example, as shown in FIGS. 9 and 10, the first claw piece 13 has a thin portion 14 located between the first claw piece 13 and the first lateral frame 12, and bending deformation of this thin portion 14 enables the first claw piece 13 to swing relative to the first lateral frame 12.

As shown in FIGS. 4 and 5, the first claw piece 13 is formed to have a rounded shape so that a leading end 13a thereof properly fits into the hook groove 34 of the hook piece 33. Moreover, since the first claw piece 13 is plate-shaped, a mark 15, such as the product number or size, corresponding to the type of the tube coupler 30 to which the checking tool 10 is to be attached can be put on the first claw piece 13 as shown in FIGS. 1 and 6, making it possible to visually recognize the type of the checking tool 10.

As shown in FIGS. 6, 7, 9, and 11, the second lateral frame 16 has a second claw piece 17 that is provided protruding inward toward the first lateral frame 12. In the embodiment shown in the drawings, the second claw piece 17 is constituted by a second claw piece main body 18 that is provided protruding from substantially the center of the second lateral frame 16, and substantially circular arc-shaped second claw piece auxiliary bodies 19 that are provided protruding from opposite sides of the second claw piece main body 18.

The second claw piece main body 18 is formed to have a rounded shape so that a leading end thereof properly fits into the hook groove 38 of the hook piece 37, and is formed to be narrower than the first claw piece 13.

The second claw piece auxiliary bodies 19 have a quarter-circular arc shape with a small width, and leading ends thereof protrude further than the second claw piece main body 18 and oppose each other. Due to their shape with a small width, the second claw piece auxiliary bodies 19 have resiliency, and act as dampers when the second claw piece main body 18 is fitted into the hook groove 38, making it possible to suppress looseness of the checking tool 10.

Figure 12:
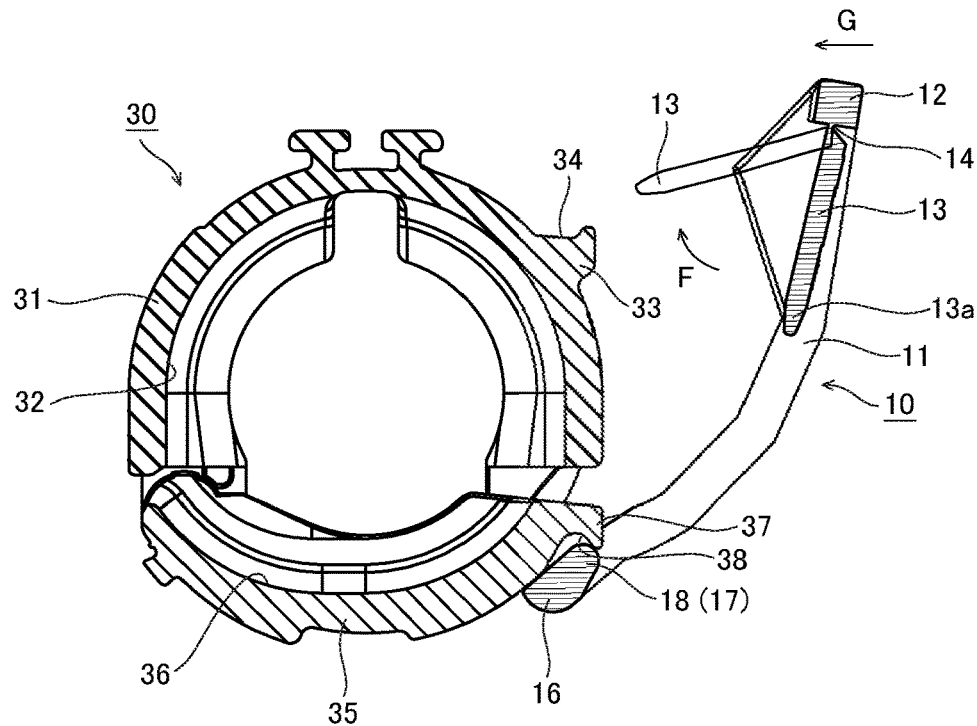
FIG. 12 is an explanatory diagram showing a process of attaching the checking tool to the tube coupler.

The checking tool 10 that is configured as described above is attached to the tube coupler 30. FIG. 12 shows a process of attaching the checking tool 10 to the tube coupler 30. As shown in the drawing, the checking tool 10 is attached to the tube coupler 30 in a state in which the first coupling piece 31 and the second coupling piece 35 of the tube coupler 30 are closed. For example, first, the second claw piece 17 of the checking tool 10 is fitted into the hook groove 38 of the hook piece 37. Then, the first claw piece 13 is pressed in the direction of an arrow F toward the tube coupler 30. As a result, due to the thin portion 14, the first claw piece 13 is pushed out relative to the first lateral frame 12, and the leading end 13a of the first claw piece 13 is rotated upward. Thus, the distance between the first claw piece 13 and the second claw piece 17 increases, and in this state, the first claw piece 13 can be fitted into the hook groove 34 of the hook piece 33. Then, the checking tool 10 is pressed against the tube coupler 30 as indicated by an arrow G. Thus, with the thin portion 14 acting as a moving portion, the checking tool 10 is moved upward and closer to the tube coupler 30 side with use of the principle of the lever. Consequently, the checking tool 10 can be attached to the tube coupler 30, as shown in FIGS. 1 to 5, in a state in which the second claw piece auxiliary bodies 19 are bent.

As shown in FIG. 4, the attachment state of the checking tool 10 is maintained by the first claw piece 13 and the second claw piece main body 18 of the second claw piece 17 being fitted into the hook grooves 34 and 38 of the hook pieces 33 and 37. Also, as shown in FIG. 5, the second claw piece auxiliary bodies 19 are pressed against the hook groove 38 in the state in which the second claw piece auxiliary bodies 19 are bent due to their resiliency, thereby making it possible to suppress unsteadiness of the checking tool 10.

The checking tool 10 of the present invention can be attached only in a state in which the first coupling piece 31 and the second coupling piece 35 are completely closed after the tube coupler 30 has been mounted to the joint-equipped tubes. Accordingly, by simply visually confirming that the checking tool 10 is attached, it is possible to determine that the tube coupler 30 is correctly mounted. On the other hand, if the checking tool 10 is not attached, this means that the tube coupler 30 is not correctly mounted, or it has not been confirmed that the tube coupler 30 is correctly mounted, and therefore, the mounting state of the tube coupler 30 can be checked again, and then the checking tool 10 can be attached.

Figure 13:
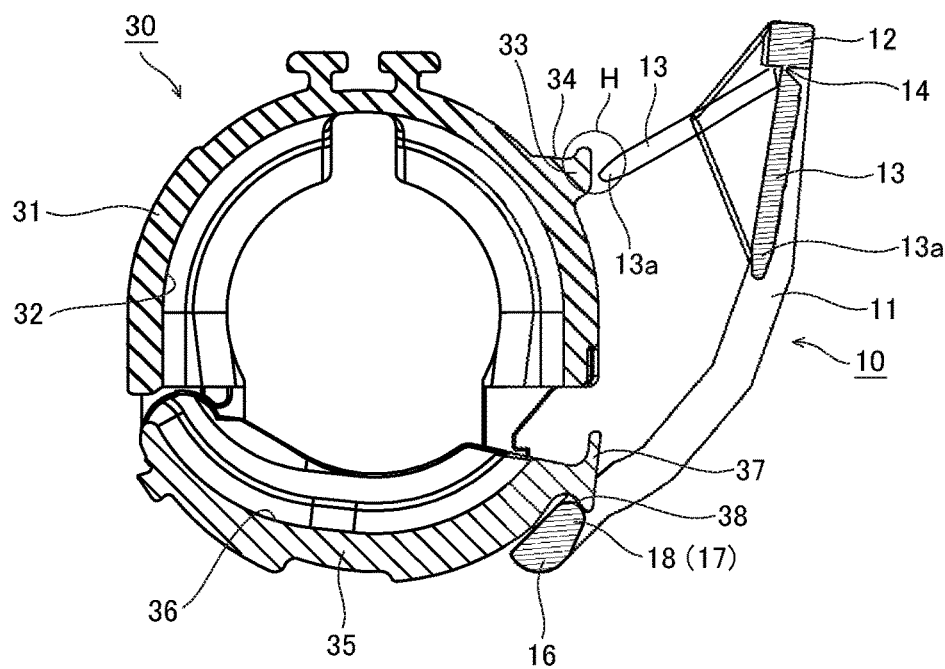
FIG. 13 is a cross-sectional view showing a state in which the checking tool is about to be attached to the tube coupler in an opened state.

FIG. 13 shows a state in which the first coupling piece 31 and the second coupling piece 35 of the tube coupler 30 are opened rather than being completely closed. It can be seen that, in this case, if an attempt is made to attach the checking tool 10 in the same manner as described above, the first claw piece 13 interferes with the hook piece 33 as shown in a portion H enclosed by a circle, and the checking tool 10 cannot be attached to the tube coupler 30.

In this case, after the first coupling piece 31 and second coupling piece 35 are completely closed, the checking tool 10 can be attached again.

Figure 14:
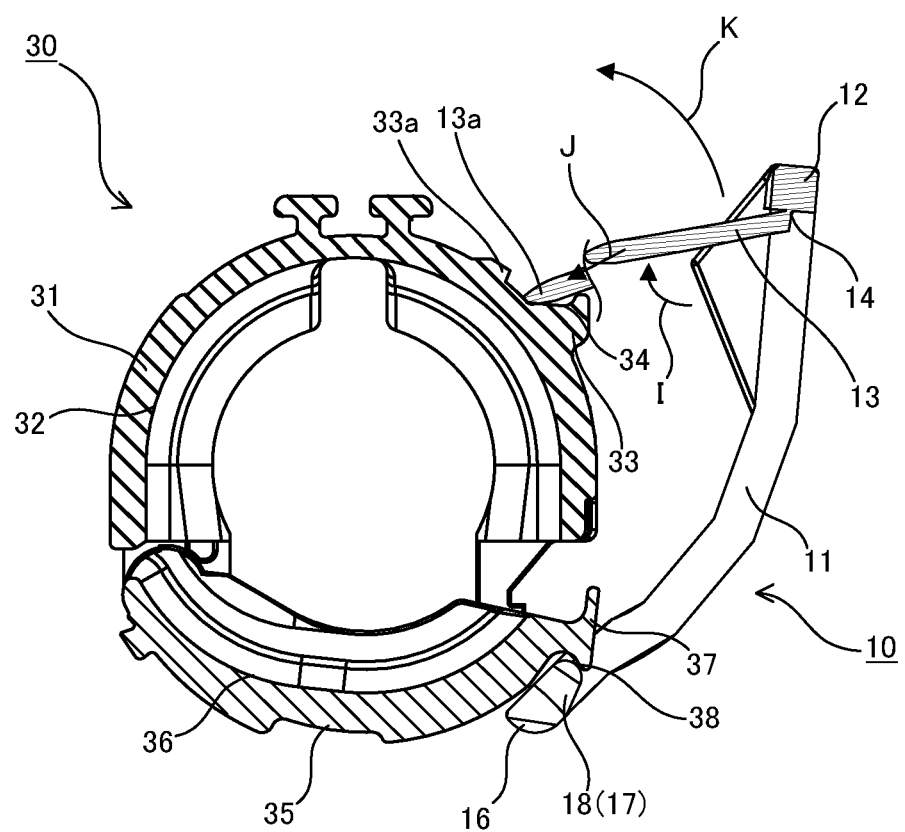
FIG. 14 is an explanatory diagram showing a process of attaching the checking tool to the tube coupler in an opened state.

Alternatively, as shown in FIG. 14, in a state in which the second claw piece 17 is hooked on the hook groove 38 of the hook piece 37, the first claw piece 13 is further pressed and rotated as indicated by an arrow I in FIG. 14. Subsequently, the checking tool 10 is pushed toward the tube coupler 30 as indicated by the direction of an arrow J, and is positioned such that the leading end 13a of the first claw piece 13 passes the hook piece 33 and is hooked on the hook groove 34. In this state, the checking tool 10 is moved upward in the direction of the arrow K. Thus, with the thin portion 14 acting as a moving portion, the checking tool 10 brings the second coupling piece 35 closer to the first coupling piece 31 with use of the principle of the lever, and therefore, the first coupling piece 31 and the second coupling piece 35 that have been in the opened state can be closed. That is to say, at the same time as attaching the checking tool 10, it is possible to guarantee that the first coupling piece 31 and the second coupling piece 35 are in a completely closed state. Accordingly, even if the operation of closing the first coupling piece 31 and the second coupling piece 35 in advance is incomplete, it is possible to completely close the first coupling piece 31 and the second coupling piece 35 with use of the checking tool 10 while attaching the checking tool 10, and thus, the workability can be increased as much as possible.

Note that, after the first claw piece 13 has been fitted into the hook groove 34, if the checking tool 10 is moved upward in the direction of the arrow K, the first claw piece 13 may be disengaged from the hook groove 34.

In this case, as indicated by a reference numeral 33a in FIG. 14, a projection can be formed on the circumferential surface of the first coupling piece 31 in advance, at a position on the opposite side of the hook groove 34 from the hook piece 33. Providing the projection 33a makes it possible that, when the checking tool 10 is moved upward in the direction of the arrow K, the leading end 13a of the first claw piece 13 abuts against the projection 33a and is thereby prevented from disengaging from the hook groove 34, and thus, the workability can be increased even further.

To detach the checking tool 10 of the present invention from the tube coupler 30, the first lateral frame 12 side can be pulled obliquely downward. As a result, the thin portion 14 of the first claw piece 13 is bent, and the checking tool 10 tilts. Subsequently, the first claw piece 13 disengages from the hook groove 34, and thus, the checking tool 10 can be easily detached from the tube coupler 30.

The foregoing description is given merely to describe the present invention. Accordingly, it should not be construed as limiting the invention recited in the appended claims or narrowing the scope of the present invention. Also, the constituent elements of the present invention are not limited to those described in the example above, and it is of course possible to make various modifications within the technical scope defined in the appended claims.

For example, in the foregoing embodiment, for convenience of description, the first claw piece 13 is attached to the hook piece 33 of the first coupling piece 31, and the second claw piece 17 is attached to the hook piece 37 of the second coupling piece 35. However, it goes without saying that the first and second claw pieces may also be attached in reverse.

The shape, number, size, and the like of the claw pieces 13 and 17 are not limited to those of the foregoing embodiment. For example, it is also possible that the first claw piece 13 and the second claw piece 17 have the same shape. Moreover, it is, of course, also possible that the second claw piece 17 is constituted by only the second claw piece main body 18 or only the second claw piece auxiliary bodies 19. Furthermore, the shape and configuration of the tube coupler 30 also are, of course, not limited to those of the foregoing embodiment.

[REFERENCE SIGNS LIST]
   10 Checking tool
   11 Longitudinal frames
   12 First lateral frame
   13 First claw piece
   16 Second lateral frame
   17 Second claw piece
   30 Tube coupler

What is claimed is:

1. A checking tool for a tube coupler,
the checking tool being configured to be attached to a tube coupler, the tube coupler being formed of a first coupling piece and a second coupling piece hingedly connected to each other so as to be able to be opened and closed, being configured to couple tubes to each other with use of the first coupling piece and the second coupling piece, and having hook pieces that are provided protruding from outer circumferential surfaces of the first coupling piece and the second coupling piece,
the checking tool comprising:
a pair of longitudinal frames that conform to an outer circumferential surface of the tube coupler;
a first lateral frame that connects end portions at one end of the pair of longitudinal frames to each other;
a second lateral frame that connects end portions at another end of the pair of longitudinal frames to each other;
a first claw piece that is provided protruding from the first lateral frame toward the second lateral frame; and
a second claw piece that is provided protruding from the second lateral frame toward the first lateral frame,
wherein the checking tool is attached to the tube coupler by hooking, in a state in which the first coupling piece and the second coupling piece of the tube coupler are closed, the first claw piece on the hook piece of the first coupling piece and the second claw piece on the hook piece of the second coupling piece, and
wherein the second claw piece has a second claw piece main body that is provided protruding from the center of the second lateral frame, and a pair of second claw piece auxiliary bodies that are provided protruding from opposite sides of the second claw piece main body, the second claw piece auxiliary bodies having resiliency and protruding further than the second claw piece main body.

2. The checking tool for a tube coupler according to claim 1,
wherein the first claw piece is swingable in a direction that is perpendicular to the first lateral frame.

* * * * *